Oct. 30, 1951     R. M. BRYCE     2,573,396
WIND DEFLECTOR
Filed May 10, 1949
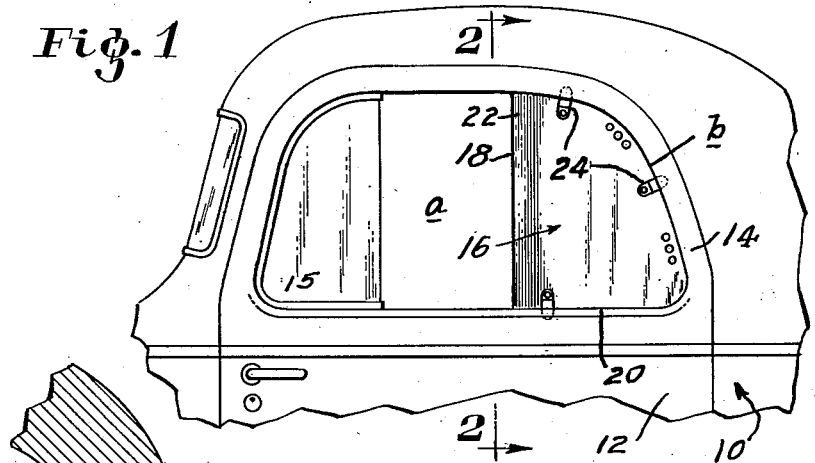
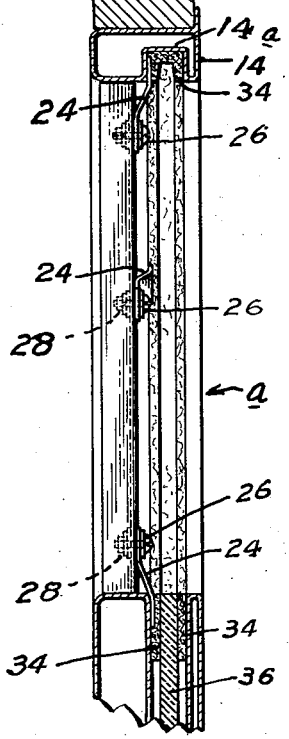
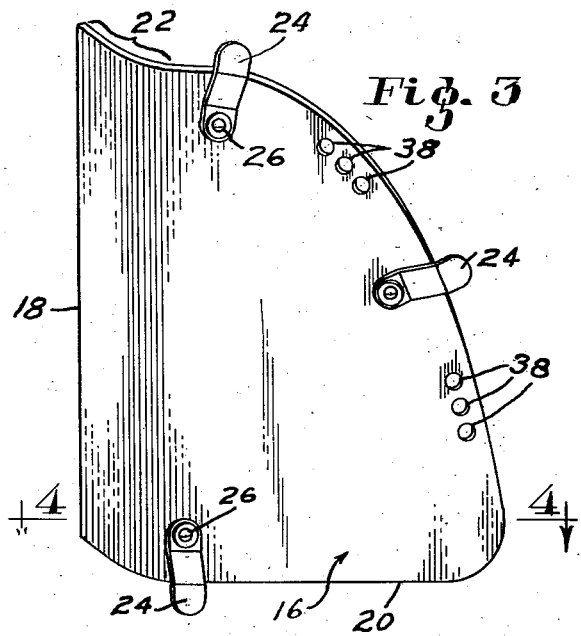
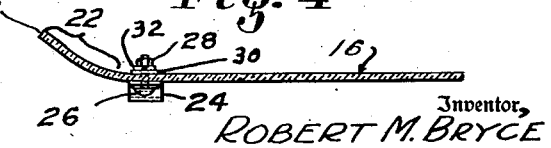
Inventor,
ROBERT M. BRYCE
By
his Attorney Patented Oct. 30, 1951

2,573,396

UNITED STATES PATENT OFFICE 2,573,396

WIND DEFLECTOR

Robert M. Bryce, Los Angeles, Calif., assignor to Mildred Friend, Los Angeles, Calif.

Application May 10, 1949, Serial No. 92,419

2 Claims. (Cl. 98—2)

My invention relates to an auxiliary wind or draft deflector for use on automobiles and other vehicles operated at speeds sufficient to cause a draft or rush of air past the front side windows of the vehicle and to eliminate drafts within the automobile when driving with the windows open.

The window on the driver's side is usually kept open to enable the driver to make hand signals required by traffic regulations, and the air stream of a car not equipped with my novel deflector, although it may be deflected outwardly by the usual wind wings at the front part of the window, is curved inwardly again by air pressure and a considerable amount of the air enters the open window toward the back thereof at considerable speed causing a draft flowing over the driver's head and shoulders and circulating around the interior of the body of the vehicle, and an object of my invention is the provision of a novel, simple, and inexpensive device that will eliminate such drafts.

Various auxiliary wind or draft deflectors that fit in the back of the front side windows have been proposed and are in use but, to the best of my knowledge, suffer from various drawbacks from which the wind deflector of my invention is free.

It is accordingly an object of my invention to provide a novel auxiliary wind or draft deflector for automobiles and the like which is efficient and trouble-free in service.

Another object of my invention is to provide a novel auxiliary wind or draft deflector which is easy to install in position in the window frame of automobiles without requiring any distortion of the deflector and thus enabling substantially rigid and transparent materials to be used, such as a transparent plastic.

A further object of my invention is to provide a novel auxiliary wind or draft deflector with a securing means that may be positioned in the window frame of the automobile without danger of chipping or marring the glass of the ordinary window when the same is moved to open or closed position, or vice versa.

The invention comprises the parts and combinations and arrangements of such parts as more fully hereinafter described and pointed out in the appended claims.

Other objects, advantages and features of invention may appear from the accompanying drawing, the subjoined detail description and the appended claims.

The accompanying drawing illustrates the invention in a form I at present deem preferable.

Figure 1 is a side elevational view showing the driver's side window of an automobile with the deflector of my invention mounted in the window frame, parts of the automobile are broken away to contract the view.

Figure 2 is a fragmentary cross-sectional view on enlarged scale, and taken on line 2—2, Fig. 1.

Figure 3 is a perspective side elevational view on the same scale as Fig. 2 showing the deflector of my novel invention before installation in an automobile window frame.

Figure 4 is a fragamental cross-sectional view taken on line 4—4, Fig. 3, and on the same scale as Figs. 2 and 3.

In the drawing the numeral 10 indicates generally the driver's side of an automobile, having a door 12 fitted therein and formed with a window frame 14 at the front of which is fitted the usual or customary wind wing 15, the rear edge of which is adapted to be swung outwardly to various distances within the limits of its mounting pivots (not shown).

The wind deflector of my invention is shown at 16 and is mounted in the rear of the window frame opening $a$ in position to be impinged on by the air stream flowing over the side of the body, such of which, without the provision of the deflector, would flow into the interior of the car when the window is open but by the use of my deflector the greater part of the current of air is prevented from setting up drafts in the rear portion of the interior of the automobile body.

The deflector 16 of my invention comprises a sheet of transparent material, such as one of the numerous transparent plastics and is cut to provide a more or less vertical front edge 18, a horizontal bottom edge 20 and having the remainder of its periphery $b$ shaped to follow and fit closely to the rear portion of the window frame of the style and make of the auto to which it is applied.

The forward portion of the deflector is bent inwardly, as indicated at 22, but the remainder of the deflector is preferably of a flat surface. The effect of the inwardly bent portion 22 of the deflector 16 is to intercept much of the backwardly and inwardly moving stream of air tending to enter the window opening $a$ and deflect it outwardly to join the flow of air over the side of the automobile, although, of course, some air will enter the forward portion of the interior.

It will be noted by reference to Figs. 3 and 4 that the inward bend 22 of the deflector is uniform over the height of the window, and the bent portion, as shown in Fig. 2, is of such length as preferably to bring the front edge of the deflector into the plane of the inner surface of the door. The deflector is readily secured in position preferably by means of outwardly extending metal clamps or lugs 24 secured to the margin of the deflector by any suitable means, such as the small threaded studs 26 passing through holes drilled in the deflector and secured by nuts 28 which may be safety nuts of the type holding tight against vibration, or as shown in Fig. 4, may be ordinary nuts tightened against metal washers 30 placed against the inner face of the deflector, lock washers 32 of the usual split spring type being positioned between the nuts 28 and washers 30.

The manner of mounting the wind deflector 16 is clearly shown in Fig. 2. It will be noted that the window frame 14 is molded to provide a wide channel 14a which is fitted with a U shaped guiding and cushioning member 34 of soft material such as soft rubber or felt, for the window glass or closure member 36 for the window openings. The member 34 is commonly cemented in place in the channel 14a all around the portion of the frame into which the window may be raised or lowered and such construction of the molding is called in the trade a revere molding, and it is an easy matter to work a thin piece of metal such as the ends of lugs 24 between the side of the metal channel 14a and the abutting face of the U member 34.

In mounting the wind deflector in place the lugs 24 are turned on studs 26 so as not to project beyond the edge of the deflector, which is then positioned when the window is in lowered position, in abutment with the back portion of the window opening, and the lugs 24 are then swung outwardly and worked between the inside face of channel 14a and the window glass guiding and cushioning member 34 mounted in said channel.

As clearly shown in Fig. 2, the lugs 24 are offset sufficiently to bring the lug mounting parts 24 and the draft deflector out of the plane in which the window glass 36 moves when raised, so that no obstruction is presented to free operation of the window. The studs 26 are then tightened up whereupon the deflector will be held securely in position.

It has been found in practice that a lug 24 at the commencement of the inward slope or bend of the deflector at top and bottom and another lug about midway of the rear edge of the deflector, as shown in Fig. 3, are sufficient to firmly hold the deflector in place, but it will be evident that the number and placement of the lugs is a matter of choice.

In the assembled position of the deflector the inturned vertical front edge 18 thereof will lie generally within the plane of the window frame, thus not offering any obstruction to free movement of the driver's shoulders or to movement of his arm in making traffic signals.

It may be desirable to provide a limited flow of air through the draft deflector 16, and for this purpose holes 38 may be provided in the deflector as shown in Fig. 3, although such ventilating holes may be omitted.

It will be evident that I have provided a novel, simple, inexpensive and easily installed draft deflector, and which when installed as described will effectively deflect the wind and eliminate drafts on rear seat passengers when driving an auto with the front window thereof opened, and the convex edge 18 not only prevents drafts from annoying the rear seat passengers but also enhances the appearance of the car itself.

Although I have shown and described particular embodiments of invention, I do not wish to be limited thereto but desire to include in the scope of my invention such constructions, combinations and arrangements as may be embraced and defined in the accompanying claims.

I claim:

1. An air stream deflector adapted to be positioned in the window frame of an automobile having the usual window opening provided with guides, and a transparent closure for said opening slidable in said guides, and comprising; a sheet of transparent material and being uniformly curved inwardly at its forward edge and from top to bottom of the window frame, the remaining portion of the air stream deflector being substantially flat and being arranged to lie in a plane parallel to and inwardly spaced from the plane of the usual sliding glass for closing the opening of the window frame, the periphery of the remainder of the air stream deflector being shaped to closely fit the rear portion of said window frame; means secured to and having a portion extending beyond the periphery of said deflector and said portion being adaptable to be positioned between said guides and the window frame and clear of the path of movement of the closure for the window; and an apertured area toward the rear portion of the deflector to allow restricted passage of air through said apertured area.

2. An air stream deflector adapted to be positioned in the window frame of an automobile having the usual window opening provided with guides, and a transparent closure for said opening slidable in said guides, and comprising; a sheet of transparent material and being uniformly curved inwardly at its forward edge and from top to bottom of the window frame, the remaining portion of the air stream deflector being substantially flat and being arranged to lie in a plane parallel to and inwardly spaced from the plane of the usual sliding glass for closing the opening of the window frame, the periphery of the remainder of the air stream deflector being shaped to closely fit the rear portion of said window frame; lugs offset intermediate their ends and adapted to be engaged in said window frame and effective to hold the deflector inwardly and out of the path of movement of the slidable closure for the window, and an apertured area toward the rear portion of the deflector to allow restricted passage of air through said apertured area.

ROBERT M. BRYCE.

REFERENCES CITED

The following references are of record in the file of this patent:

UNITED STATES PATENTS

| Number | Name | Date |
|---|---|---|
| 1,891,390 | Liebig | Dec. 20, 1932 |
| 2,065,085 | Lynes | Dec. 22, 1936 |
| 2,242,606 | Duncan | May 20, 1941 |
| 2,281,840 | Hamilton | May 5, 1942 |